(12) United States Patent
Rey

(10) Patent No.: US 6,289,790 B1
(45) Date of Patent: Sep. 18, 2001

(54) CLUTCH HYDRAULIC CONTROL DEVICE, IN PARTICULAR FOR MOTOR CAR

(75) Inventor: Frédéric Rey, Paris (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/485,175

(22) PCT Filed: Jun. 8, 1999

(86) PCT No.: PCT/FR99/01355

§ 371 Date: May 1, 2000

§ 102(e) Date: May 1, 2000

(87) PCT Pub. No.: WO99/64758

PCT Pub. Date: Dec. 16, 1999

(30) Foreign Application Priority Data

Jun. 9, 1998 (FR) .................................................. 98 07213
Feb. 26, 1999 (FR) .................................................. 99 02429

(51) Int. Cl.⁷ ............................... F16D 25/08; F15B 7/08; B60T 11/16
(52) U.S. Cl. .............................. 92/170.1; 92/187; 92/248; 60/588
(58) Field of Search .............................. 92/172, 187, 189, 92/190, 169.1, 170.1, 248, 255; 60/533, 585, 588

(56) References Cited

U.S. PATENT DOCUMENTS

| 2,202,351 | * | 5/1940 | Loweke .................................. 60/588 |
| 3,266,383 | * | 8/1966 | Cairns ............................. 92/170.1 X |
| 3,779,672 | * | 12/1973 | Schroeder .......................... 92/248 X |
| 4,941,323 | * | 7/1990 | Leigh-Monstevens .......... 92/169.1 X |
| 5,253,577 | * | 10/1993 | Schonlau et al. ................... 92/170.1 |

FOREIGN PATENT DOCUMENTS

| 3713248 A | 11/1988 | (DE) . |
| 4000835 A | 7/1991 | (DE) . |
| 19700025 A | 7/1997 | (DE) . |
| 19620580 A | 11/1997 | (DE) . |
| WO 8911600 A | 11/1989 | (WO) . |

* cited by examiner

*Primary Examiner*—John E. Ryznic
(74) *Attorney, Agent, or Firm*—Liniak, Berenato, Longacre & White

(57) ABSTRACT

The invention concerns a device comprising a shift cylinder with a cylinder body (17) bearing a first sleeve (54) for guiding a second sleeve (42) enclosing an axially mobile piston (21) with an intervening piston seal between the second sleeve (42) and the piston (21) and a secondary seal (59) between the body (17) and the second sleeve (42) penetrating into the hydraulic chamber. The invention is applicable to motor vehicles.

22 Claims, 8 Drawing Sheets

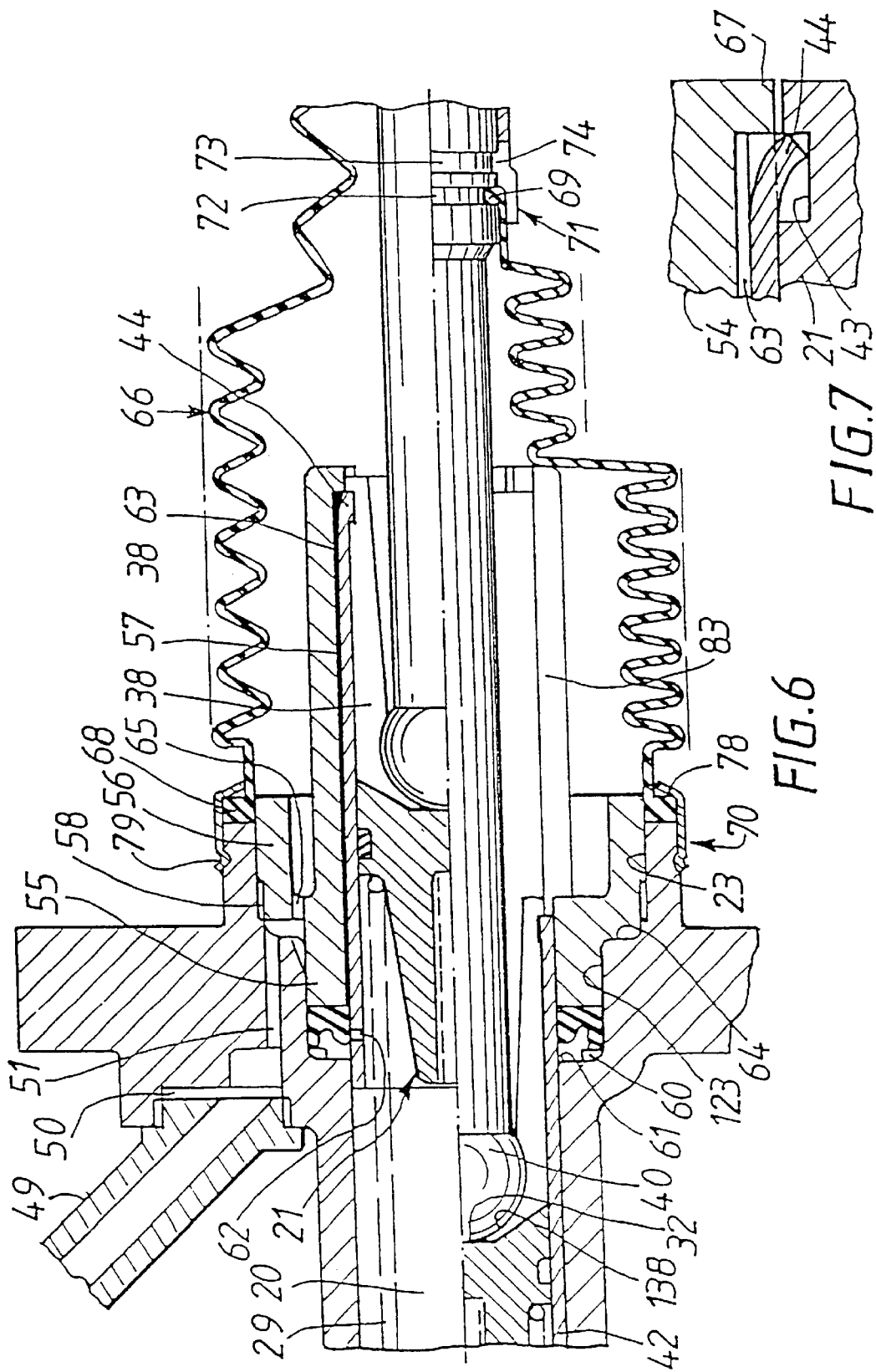

CLUTCH HYDRAULIC CONTROL DEVICE, IN PARTICULAR FOR MOTOR CAR

International patent application Ser. No. PCT/FR99/01355, publication No. WO99/64758

BACKGROUND OF THE INVENTION

1. Field of the Invention

This invention relates to a device for the hydraulic control of a clutch, especially for motor vehicles, comprising at least one emitter or receiver cylinder having a piston.

More particularly, the invention relates to a hydraulic control device for a motor vehicle clutch including at least one control cylinder, of the type in which the cylinder comprises a substantially tubular cylinder body in which there slides axially a piston which, through a front transverse face, bounds a hydraulic chamber, and which is in cooperation through a rear transverse face with a piston rod, wherein an aperture for connection of a pipe or a duct is open into the hydraulic chamber, and wherein the cylinder body is made of mouldable material such as plastics material.

Such a device is described for example in the document DE-U-2951 6488.

2. Description of the Related Art

In the latter, the piston is part of an assembly which includes a metallic piston skirt.

More precisely, the piston skirt has at its front end a projecting element on which the piston is formed by applied moulding. The skirt serves as a receptacle for two half shells which are so configured as to receive the head of the rod of the piston.

In addition, the piston carries a piston seal which is adapted to cooperate with a metallic guide sleeve mounted in the internal bore of the cylinder body and bounding the hydraulic chamber, while the cylinder body carries a secondary seal which is adapted to cooperate with the piston skirt. The cylinder body is for this purpose stepped internally in diameter, so that it has, at its rear end, an enlarged cross section whereby it can contain the secondary seal within it. A securing skirt is mounted in this larger section so as to retain the secondary seal.

Such a solution, which calls for a large number of components, is relatively costly and necessitates the presence of a dynamic piston seal carried by the piston and cooperating with the guide sleeve fixed to the cylinder body.

An object of the present invention is to overcome these drawbacks in a simple and inexpensive way.

SUMMARY OF THE INVENTION

According to the invention, a hydraulic control device of the type described above is characterized in that the piston is so configured as to receive the head of the piston rod, in that the piston is surrounded by the piston skirt, in that the piston seal is interposed operatively between the outer periphery of the piston and the inner periphery of the piston skirt, and in that the piston skirt penetrates into the hydraulic chamber.

Thanks to the invention, the guide sleeve of the prior art is eliminated, and the piston skirt penetrates into the hydraulic chamber. The piston and the piston skirt are concentric and coaxial components, and they constitute a unit in the form of a sub-assembly which can be handled and transported.

It should be noted that the manufacturing cost of the outer surface of the piston skirt is less than the manufacturing cost of the inner surface of the guide sleeve in the prior art, the said outer surface being in cooperation with the secondary seal of the dynamic type. The immobilizing skirt is elongated axially and is a good guide for the piston skirt. The internal bore of the said skirt extends the internal bore of the cylinder body.

The piston seal has a simplified form, and acts statically between the piston and the piston skirt. In one embodiment, the piston seal consists of an O-ring seal.

The piston skirt has a simple and inexpensive tubular form. This skirt does not have a base portion.

Preferably, the piston is of plastics material such that the seating for the head of the piston rod can easily be formed by moulding.

Preferably, the cylinder body has an abutment which serves to centre the spring which acts between the base of the body of the cylinder and the piston.

The front face of the piston is arranged to come into contact with this abutment.

Thus the piston skirt only undergoes weak forces when the piston is in its retracted position.

In one embodiment, the piston has a posterior axial fixing groove into which at least one deformation of the piston skirt penetrates.

The deformation of the skirt, which constitutes a projecting element, penetrates, for example by insertion, into the groove in such a way that the piston skirt is fixed axially to the piston. For example the piston skirt has lugs or pegs penetrating into the groove of the piston.

The skirt can then be snap-fitted on the piston.

In another version, the piston skirt is secured on the piston by applied moulding.

In a further version, the skirt is secured on the piston by adhesive bonding.

It is of course possible to reverse the structures, with the piston having, for example, projecting elements that penetrate into apertures formed in the piston skirt.

In another version, the piston skirt comes into abutment on a shoulder of the front and/or rear face of the piston.

It will be noted that the piston seal plays a part in the axial retention of the piston skirt on the piston, and that the constitution of the piston in plastics material facilitates assembly of the piston skirt with the piston.

In another version, an additional plastics member is associated with the piston for trapping the piston skirt and holding it in position.

This additional member may for example be ultrasonically welded on the piston so as to retain the piston skirt.

In a further version, the welding operation is carried out locally by indirect application of heat with the aid of at least one energy source of the laser type.

The supplementary member may be attached by conical telescopic engagement on the piston in order to trap the piston skirt in position locally.

Thus in these embodiments, the piston skirt is sandwiched locally between the piston, which is preferably of a plastics material, and the additional member which is of plastics material.

In the case where the control cylinder is an emitter cylinder, the piston skirt has at least one anterior hole which puts the hydraulic chamber into communication with a reservoir associated with the emitter cylinder.

Preferably several holes are provided to ensure a higher flow of fluid, and to enable any orientation to be avoided during assembly, with a view always to having a passage in the upper part of the piston.

The position of the passage hole or holes is determined according to the action of the piston skirt which is movable from one side to the other of a secondary seal, such as a lip seal. It will be appreciated that no burr is formed at the outer periphery of the piston skirt, and this facilitates sliding of the latter within the cylinder body.

Preferably, the securing skirt has at least two posterior abutments, such as lugs or pegs, which are diametrically opposed to each other so as to cooperate with the piston skirt and limit the displacement of the latter.

Thus the tolerance of the dead travel of the piston skirt is determined by the aggregate of the tolerances of three components.

It is easily possible to incorporate an integral reservoir with the emitter cylinder.

This working cylinder can be formed by means of a bellows, or a sealed membrane which is able to be unrolled, interposed operatively between the cylinder body and the piston rod.

The membrane or the bellows has at each end a bead for fastening them on the fixed part (that is to say the cylinder body) and on the movable part (that is to say the piston rod).

Fastening members are secured, for example by snap-fitting, on the fixed part and the moving part respectively in order to retain the beads.

Thus it is possible to return leaked fluid back into the working reservoir, and the reservoir is defined by a flexible and elastic element consisting of the bellows or membrane, which are typically of elastomeric material such as rubber.

In addition, filling of the hydraulic control device for the clutch may not have been carried out before it is fitted on the motor vehicle, filling then being carried out with the aid of the main reservoir. The hydraulic control device can of course be filled beforehand.

In another version, the main reservoir may be omitted, and reliance then placed on the above mentioned integral reservoir only. In each case, the secondary seal is submerged in the control fluid so that its useful working life is increased because it is not in contact with the air.

In one embodiment, a protective cap is provided and replaces the bellows or the membrane. This cap surrounds the fastening skirt.

This cap is of plastics material and it includes a portion which defines an abutment and clipping means, such as lugs or pegs, for clipping the cap on the piston rod.

In another version, the cap is supported on the fixed part (that is to say the cylinder body or the skirt) in the same way by clipping.

In a further version, the cap retains an elastomeric sealing member, on the piston rod and the fixed part respectively.

In another version, the cap constitutes one of the members for fastening the bellows and/or the roll-out membrane.

The fastening skirt includes passages for giving communication with a working reservoir and/or a main reservoir.

The skirt has at least one circumferential or axial groove for enabling fluid to pass freely.

The skirt is attached on the cylinder body for example by ultrasonic welding, laser welding, friction welding or clipping, or by adhesive bonding or screw fastening.

Ultrasonic welding or laser type welding enable good sealing to be obtained and enable the number of seals to be reduced.

The cylinder body includes an aperture which can be closed by a plug. This aperture gives communication with the main reservoir.

In the case where, as mentioned above, an integral reservoir is enough, then the aperture is plugged. The plug is a component of the same nature as the cylinder body, being preferably of plastics material. The plug is for example ultrasonically welded on the cylinder body, the said weld giving sealing.

The fastening skirt has external mounting apertures which enable the piston skirt to be centred with respect to the cylinder body during the operation of welding by welding the skirt ultrasonically on the cylinder body.

The mounting apertures serve for receiving a fitting tool having projections which penetrate into the mounting apertures, so as to be engaged with the piston skirt and also to grip the latter.

These apertures define a space around the piston. The mounting apertures, in one embodiment, consist of blind axial slots which are open at the rear of the fastening and guiding skirt. In another version, they are oblong holes. These apertures are apertures that give access to the piston skirt. Because of the simple tool used, accurate fitting is obtained. The said tool ensures that the various bores for guiding the piston are coaxial and aligned with each other.

In another version, of course, instead of welding it is possible to use adhesive bonding.

The following description illustrates the invention with respect to the attached drawings, in which:

BRIEF DESCRIPTION OF THE DRAWINGS

FIG. 7 is a partial view taken from FIG. 6, showing the groove of the piston for fixing the piston skirt of the piston;

DETAILED DESCRIPTION OF THE PREFERRED EMBODIMENTS

Figure 1:
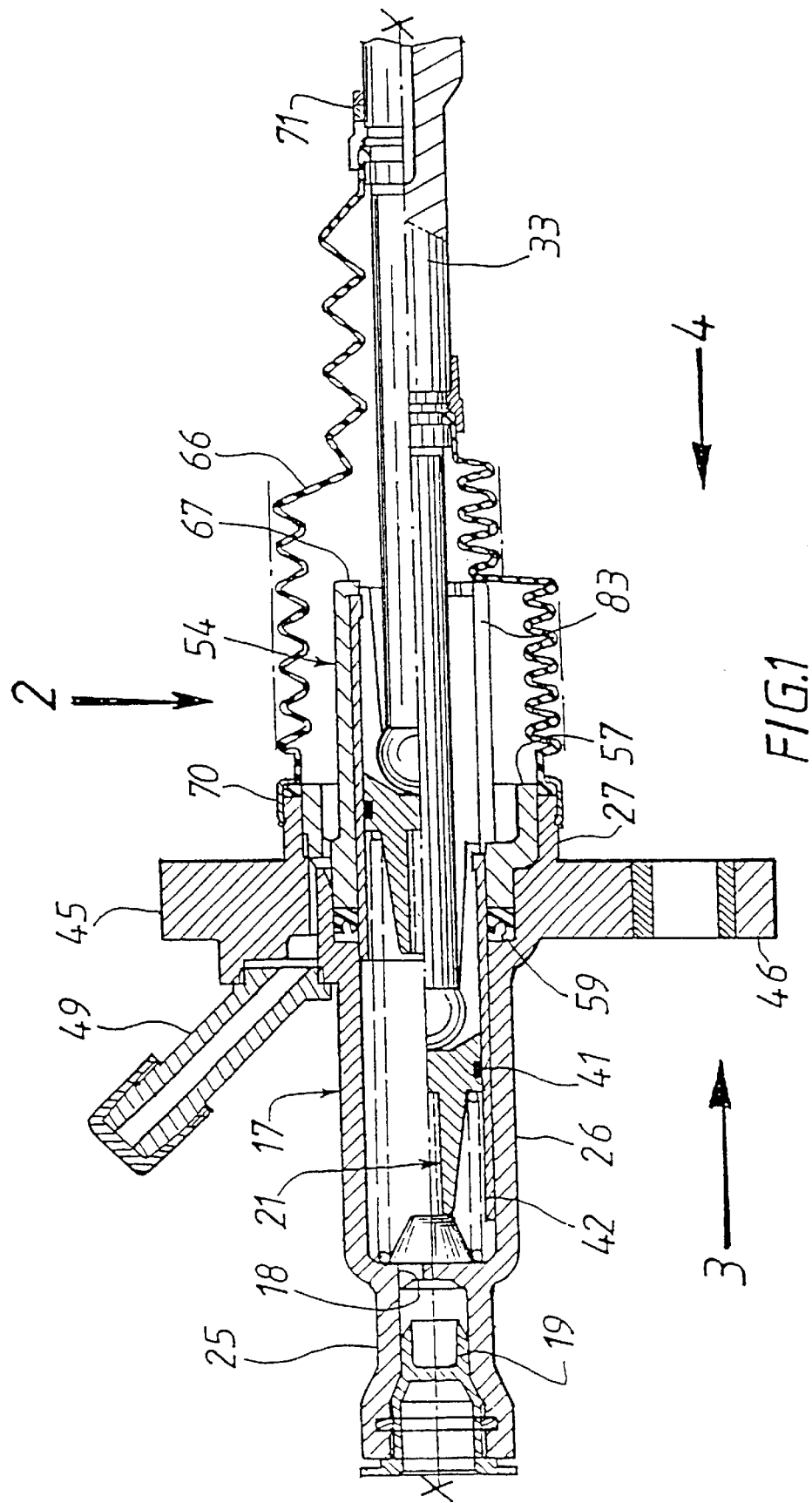
FIG. 1 is a view in axial cross section of an emitter cylinder made in accordance with the features of the invention, in which the piston is shown both in an advanced first position and in a retracted second position.

In all of the drawings, those elements which are common will be given the same reference signs.

In FIGS. 1 and 8 to 10, a control cylinder is shown in the form of an emitter of a control apparatus for a motor vehicle clutch.

Such an apparatus (not shown) includes an emitter cylinder which is connected through a duct to a receiver cylinder, the structure of which is similar to that of the emitter cylinder.

Each cylinder, whether it is a receiver or an emitter, comprises a piston which is movable axially within a cylinder body for delimiting a variable volume hydraulic chamber. A connecting orifice, on which the duct is connected, is open into the hydraulic chamber.

The emitter cylinder includes a piston rod which is connected for example to a clutch pedal operated by the driver, or an actuator which is operated in accordance with predetermined programmes.

The piston of the emitter cylinder is adapted to expel a fluid, such as oil, which is contained in the hydraulic chamber, towards the pipe or duct which connects the emitter cylinder to the receiver cylinder.

When the clutch is engaged, the volume of the hydraulic chamber of the emitter cylinder is at a maximum, while the volume of the control chamber of the receiver cylinder is at a minimum.

During operation of the clutch, the volume of the hydraulic chamber of the emitter cylinder diminishes, while the volume of the control chamber of the receiver cylinder increases.

The piston of the receiver cylinder then acts on a rod which itself acts, for example, on the declutching fork that actuates the clutch release bearing which is part of the friction clutch.

Each one of the emitter and receiver cylinders includes a spring which acts between the piston and the base of the body of the cylinder. When the driver releases the clutch pedal, or when the actuator reverts to its initial clutch engaged position, the return spring of the emitter cylinder expands in order to return the piston to its initial position, while the return spring of the emitter cylinder is compressed by the clutch spring, for example a diaphragm, which thus returns the piston of the receiver cylinder to its initial position.

In FIGS. 1 and 8 to 10, the emitter cylinder is shown in its delivery position, and it comprises a cylinder body 17 having an inlet port 18 which is closed by a plug 19. It is through this inlet port that the duct or pipe which connects the receiver cylinder to the emitter cylinder is open into the hydraulic chamber 20 of the emitter cylinder.

The chamber 20 is a variable volume chamber, and it is bounded by the body 17, while the piston 21 is mounted for axial movement within the body of the cylinder 17.

In the examples shown, the cylinder body 17 and the piston 21 are of mouldable plastics material.

This plastics material is reinforced if required with glass fibre, Kevlar and so on, in order to give the required strength to the components 17, 21.

Figure 5:
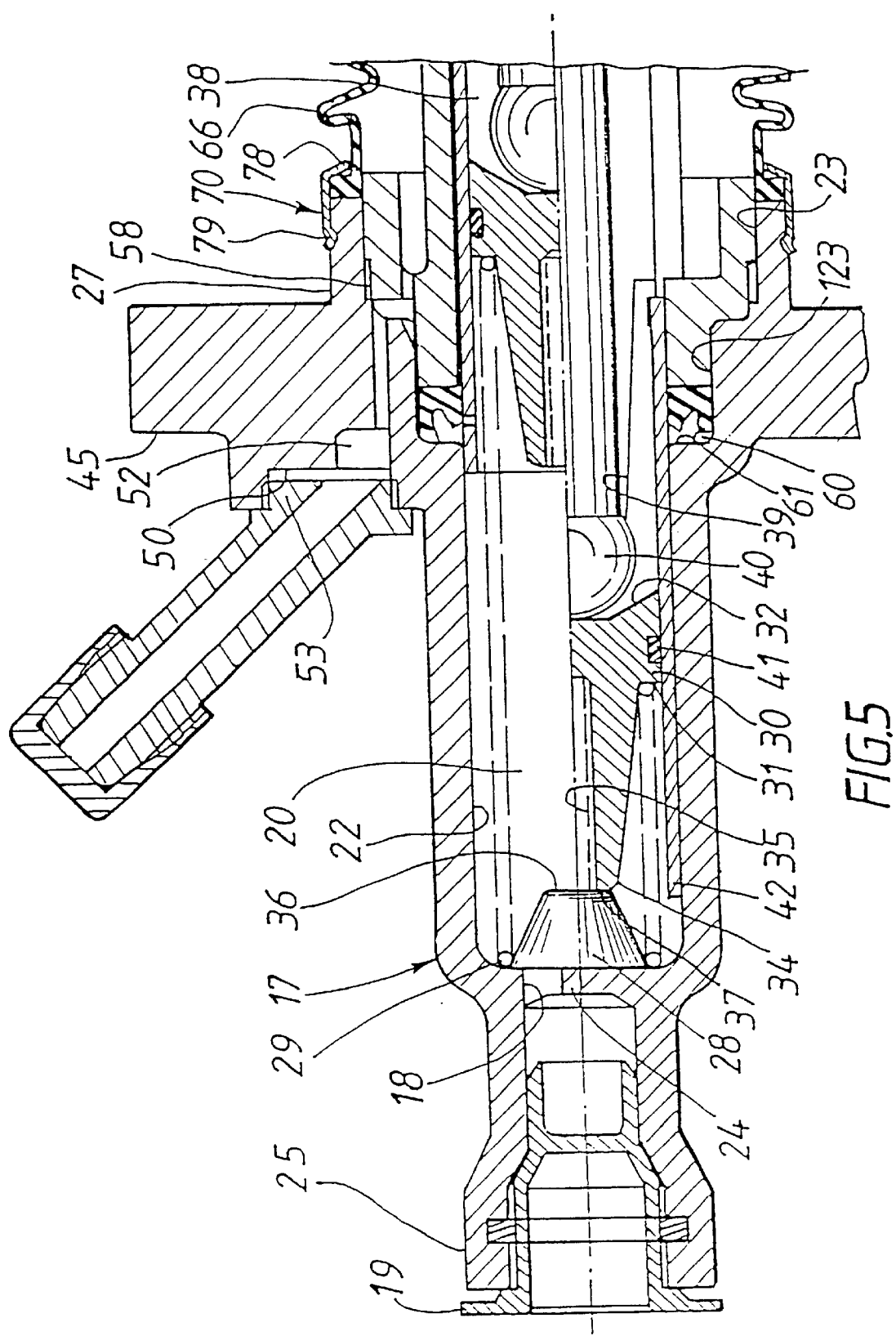

The cylinder body 17 is of generally tubular form. The body 17 has an internal bore 12, 23 of blind form, which is best seen in FIG. 5. The body 17 is in the form of an internally stepped tube having an axis of axial symmetry X—X (FIG. 1) with, at the front, a transversely orientated base 24, into which the inlet port 18 of a connecting portion 25 is open, permitting the above mentioned duct to be connected, for example by clipping, the connecting portion 25 having for this purpose internal passages, not given a reference numeral, through which a wire clip 48 is passed to connect the above mentioned duct to the emitter cylinder. In another version, the connection is of the screw type. The body 17 is open at the back.

The connection 25 and the base 24 are part of the front part 26 of the cylinder body 17, while the open other end of the cylinder body is part of the rear part 27 of the said body.

The front part 26 has a diameter which is smaller than that of the rear part 27, due to the fact that the body 17 is in the form of a stepped tube. The internal bore 22, 23 accordingly has a rear portion 23 which is within the rear part 27 and which has a larger diameter than its front portion 22 which is within the front part 26.

Stiffening ribs may be provided on the front part 26 delimited by the base 24.

The piston 21 is arranged to slide within the body 17, and more precisely in the internal bore 22, 23 of the latter, between an advance or clutch engaging position, which is shown in the upper part of FIGS. 1, 5, 6 and 8 to 10, and a retracted or declutching position which is shown in the lower part of FIGS. 1, 5, 6 and 8 to 10. In the retracted position the chamber 20 and the control fluid are under pressure, while in the advance position the chamber 20 and the control fluid are depressurised.

It will be noted that a frusto-conical projecting element 28 is formed by moulding on the base 24.

The projecting element 28 extends axially, and its base perimeter serves to centre the return spring 29, which in this example is a helical spring acting as described earlier herein between the body 17 and the piston 21, and more precisely, here, between the transverse base 24 and the front end of the piston 21.

The piston 21 has (see FIGS. 5 and 6) a transverse wall 30, the front face 31 of which delimits the hydraulic chamber 20, with its rear face 32 being in cooperation with the piston rod 33, which in this example is of metal.

The transverse wall 30 is extended forward by a chimney element 34 which has a frusto-conical external profile and a blind cylindrical central hole 35.

The base of the hole 35, which is orientated axially, is defined by the front face 31 of the wall 30.

The helical return spring 29 is mounted around the chimney element 34, the base of which serves to centre the return spring, the rear end of which bears on the front face 31 of the transverse wall 30 of the piston 21.

The spring 29 therefore works axially between the base 24 and the front face 31. The port 18 does of course extend through the base 24 and is open laterally with respect to the projecting element 28, which is formed by moulding so as to project from the base 24 and serving by virtue of its base perimeter to centre the front end of the spring 29.

The end face 36 of the projecting element 28, in accordance with one feature, acts as an abutment for the front face 37 of the chimney element 34.

More precisely, in the retracted position the piston 21 comes into contact, through the front face 37 of the chimney element 34, with the end face 36 of the projecting element 28. The body 17 accordingly has an abutment, 28, which limits the forward displacement of the piston 21.

The chimney element 34, being arranged to come into contact with the projecting element 28 which constitutes the above mentioned abutment, is rigid. The chimney element 34 stiffens the piston 21, which is made of plastics material.

The transverse wall 30 is extended towards the rear by a sleeve portion 38 which has an outwardly divergent bore 39.

In this example, the bore 39 is frusto-conical, its base being partly defined by the rear face 32 of the transverse wall 30 of the piston 21.

The base of the bore 39 is hemispherical in general form, so as to receive the head 40 of the rod 33 at its front end. The head 40 has the general form of a spherical bore which penetrates into the complementary, generally hemispherical base of the internal bore 39 of the sleeve portion 38.

The said sleeve portion 38 is divided into axial fingers by slots, in accordance with one feature.

The external form of the sleeve portion 38 is cylindrical, with an outside diameter greater than that of the chimney element 34, the head 40 of the rod 33 being arranged to spread the fingers of the sleeve portion 38 by contact with the internal bore, until it comes into contact with the hemispherical portion of the base of the bore 39.

The rod 33 is accordingly mounted by a ball-type coupling in the piston 21, and more particularly in the base of the sleeve portion 38 which is divided into axial fingers by slots.

In accordance with one feature, the transverse wall 30, and therefore the piston 21, carries at its outer periphery a piston seal 41.

In this example, the seal 41 is an O-ring seal fitted in a groove, not given a reference numeral, of the transverse wall 30 at its outer periphery. The seal may take other forms.

The said seal 41 is arranged to cooperate, in accordance with one feature, with the inner periphery of a metallic piston skirt 42. The piston skirt 42 surrounds the piston 21, and in this example it is tubular in form. The piston 21 accordingly penetrates into the interior of the skirt 42. In a manner to be described later herein, the rear end of the piston projects axially with respect to the rear face of the skirt 42.

The piston skirt 42 is for example of anodised aluminium material, or treated steel. The piston skirt 42 projects axially forward with respect to the chimney element 34. In the retracted position, the chimney element 34 is in contact with the projecting element 28, while the skirt 42 is spaced away from the base 24.

The piston chimney element 42 is spaced radially away from the chimney element 34 and return spring 29.

The said skirt 42 is in contact with the transverse wall 30 of the sleeve portion 38.

More precisely, the piston skirt 42 is in intimate contact at its inner periphery with the outer periphery of the seal 41.

The seal 41 therefore immobilises the piston skirt 42 with a gripping action.

The said skirt 42 tends to close off the sleeve portion 38. More precisely, the skirt 42, by exerting a radial force, forces the fingers of the sleeve portion 38 to become deformed radially inwards. Thus, the sleeve portion 38 is fitted in the skirt 42 in a prestressed condition.

Therefore, again, the sleeve portion 38 immobilises the piston sleeve 42 with respect to the piston 21 with a gripping action.

The said skirt 42 is thus, in accordance with one feature, fixed axially with respect to the piston 21.

The said skirt is also fixed to the piston 21 for rotation with the latter, by virtue of the seal 41 and sleeve portion 38.

In order to complete this axial immobilisation, and also to complete the immobilisation against rotation of the skirt 42 with respect to the piston 21, it is proposed that one of the elements consisting of the piston skirt 42 and the piston 21 should have one or more lugs penetrating into one or more recesses formed in the other one of the elements consisting of the piston 21 and piston skirt 42.

For example, the skirt 42 may have at its rear end holes into which there penetrate radial projections in the form of lugs, which project from the outer periphery of the sleeve portion 38 at the rear of the latter. The skirt is therefore force-fitted over the outer periphery of the piston 21, until the radial projections of the sleeve portion 38 penetrate into the holes of the skirt 42.

Thus the skirt 42 is snap-fitted on its piston 21.

In this example, as can be seen in FIG. 7, the rear end of the sleeve portion 38 has at its outer periphery a fastening groove 43, while the rear end of the piston skirt 42 is deformed locally, radially inwards, so as to form lugs 44 which come into engagement with the rear flank and the base of the fastening groove 43.

In another version, the rear end of the skirt 42 is formed with local teeth or has fingers to penetrate into the fastening groove 43.

In a further version, the rear end of the skirt is secured on the piston 21 by in situ moulding.

Regardless of all this, in all cases a sub-assembly is formed consisting of the piston 21 and the piston skirt 42, to constitute a unit which is movable axially in the body 17. The skirt 42 and the piston 21 are components which are concentric and coaxial with each other.

The said piston skirt 42 prevents the fingers of the sleeve portion 38 from being spread radially outwards, so that it locks the rod 33 axially in the interior of the piston 21 without any additional component. The rod 33 is therefore unable to escape axially from the piston 21, while it remains able to rotate in three dimensions, by virtue of the seating 1 38 (which in this example is generally hemispherical in form) of the sleeve portion 38, and the rear face 32. It is of course possible to control the stress exerted by the piston skirt 42 on the sleeve portion 38 in such a way that the piston rod 33 can be removed manually.

All of this is made possible because the piston is made of plastics material and because of the flexibility of the sleeve portion 38.

It is of course possible to secure the skirt 42 on the piston 21 by adhesive bonding, after the piston rod 33 has been introduced into the piston. In all cases, the piston 21 is, in accordance with one feature of the invention, configured internally so as to receive the head 40 of the piston rod 33. The piston 21 has an internal seating for the head 40. The seating is defined by the sleeve portion 38, which is flexible because of its slots, and the rear face 32.

The said head 40 may, in this connection, take another form, and the same is true for the interior of the sleeve portion 38 and seating.

The body 17 is adapted to be fixed on a fixed part of the vehicle, and is accordingly part of a fixed part of the emitter cylinder, while the piston 21 and the piston rod 33 are part of the movable part of the said cylinder.

For this purpose, the body 17 in this example has an integral intermediate plate 45 between the front part 26 and rear part 27 of the body 17.

The plate 45 has two parallel edges which are joined together by two pointed lateral flanks.

The plate 45 is formed integrally by moulding with the front part 26 and rear part 27 of the body 17, and projects transversely with respect to the tubular parts 26, 27. In this example the plate 45 has two fastening ears 46 which project radially with respect to the parts 26, 27.

These ears 46 have holes 47, through which there pass fastening members, usually screws, for fastening the body 17, and therefore the emitter cylinder, to a fixed part of the motor vehicle.

Figure 3:
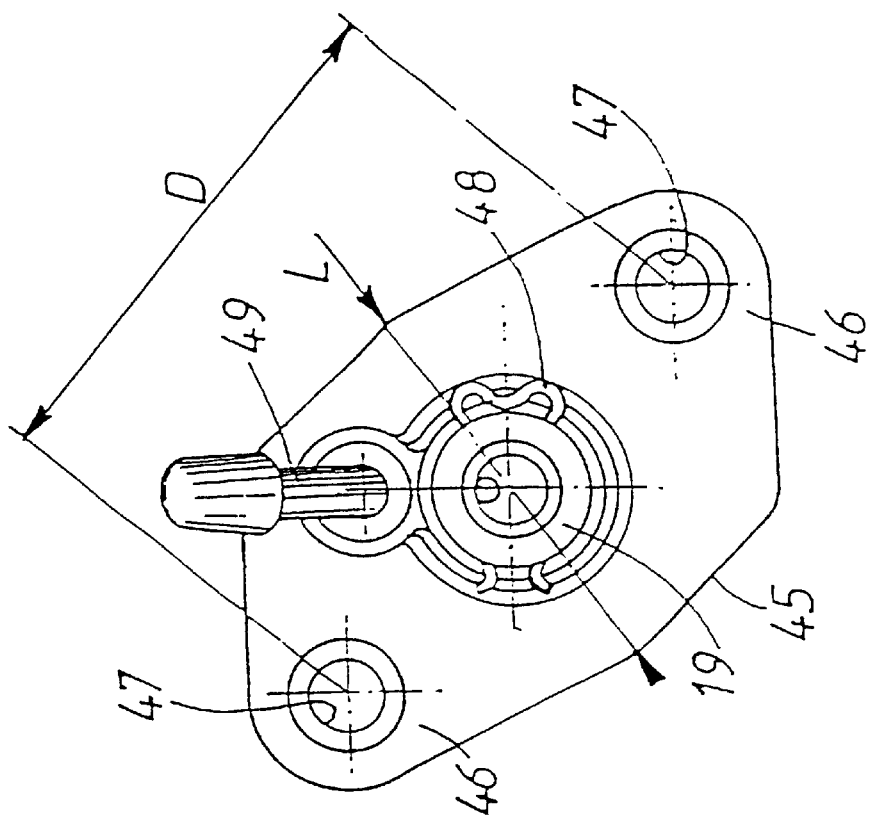
Figure 4:
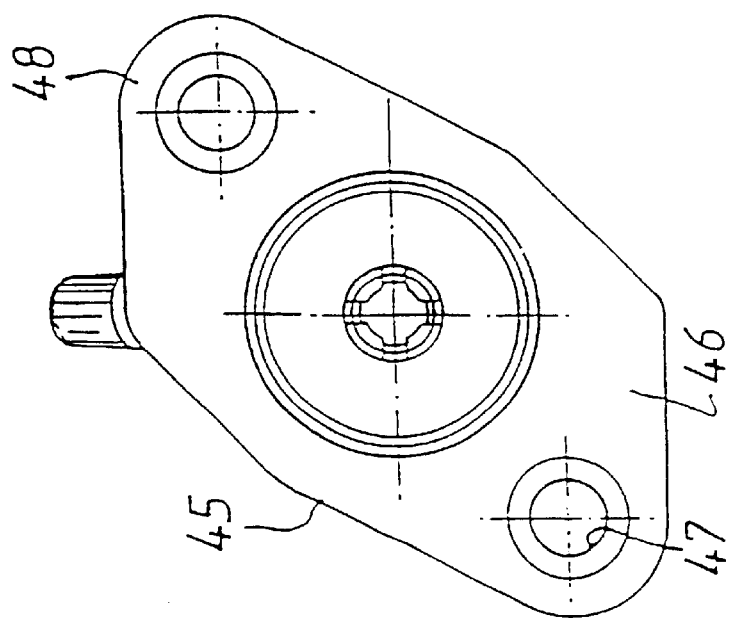

In FIG. 3, the distances D and L show the distance between the axes of the holes 47 and the distance between the summits of the lateral flanks of the plate 45, respectively. Also, at 48, there can be seen the wire clip which is carried by the connector 25, and which serves for the rapid clip fastening of the end of the above mentioned duct in the connector 25.

A tube 49, fixed to the body 17, can also be seen in FIG. 3.

This tube 49 serves to connect the interior of the body 17 with a main feed reservoir which is mounted on the outside of the emitter cylinder, given that the hydraulic chambers of the emitter and receiver cylinders are filled with a hydraulic fluid which in this example is oil. The reservoir is partially filled with this hydraulic fluid, and is connected through a duct, not shown, to the tube 49 which is open into an aperture 50 formed in the front of the plate 45 which is integral, by moulding, with the body 17. The aperture 50 is connected to a duct 51 extending through the plate 45 (FIG. 6). In this case several ducts 51 are provided.

These ducts 51 are open at the front into a feed groove 52 which is in communication with the aperture 50, while the ducts 51 are open at the rear end, within the rear part 27 of the body 17, and more precisely in the bore 23 of the rear part 27.

The aperture 50 is annular in form, and the tube 49 has at its base a shouldered ring portion 53 which is complementary to the aperture 50 and penetrates into the latter, in such a way that the tube can be secured by sealed adhesive bonding to the plate 45.

In this example, fastening of the tube 49 to the plate 45 is obtained by insertion of the ring portion 53 into the aperture 50, and then by making an ultrasonic weld between the annular edge of the aperture 50 and the outer periphery of the ring portion 53.

To this end, the tube 49 is of course made of a plastics material which is compatible with the body 17.

Figure 9:
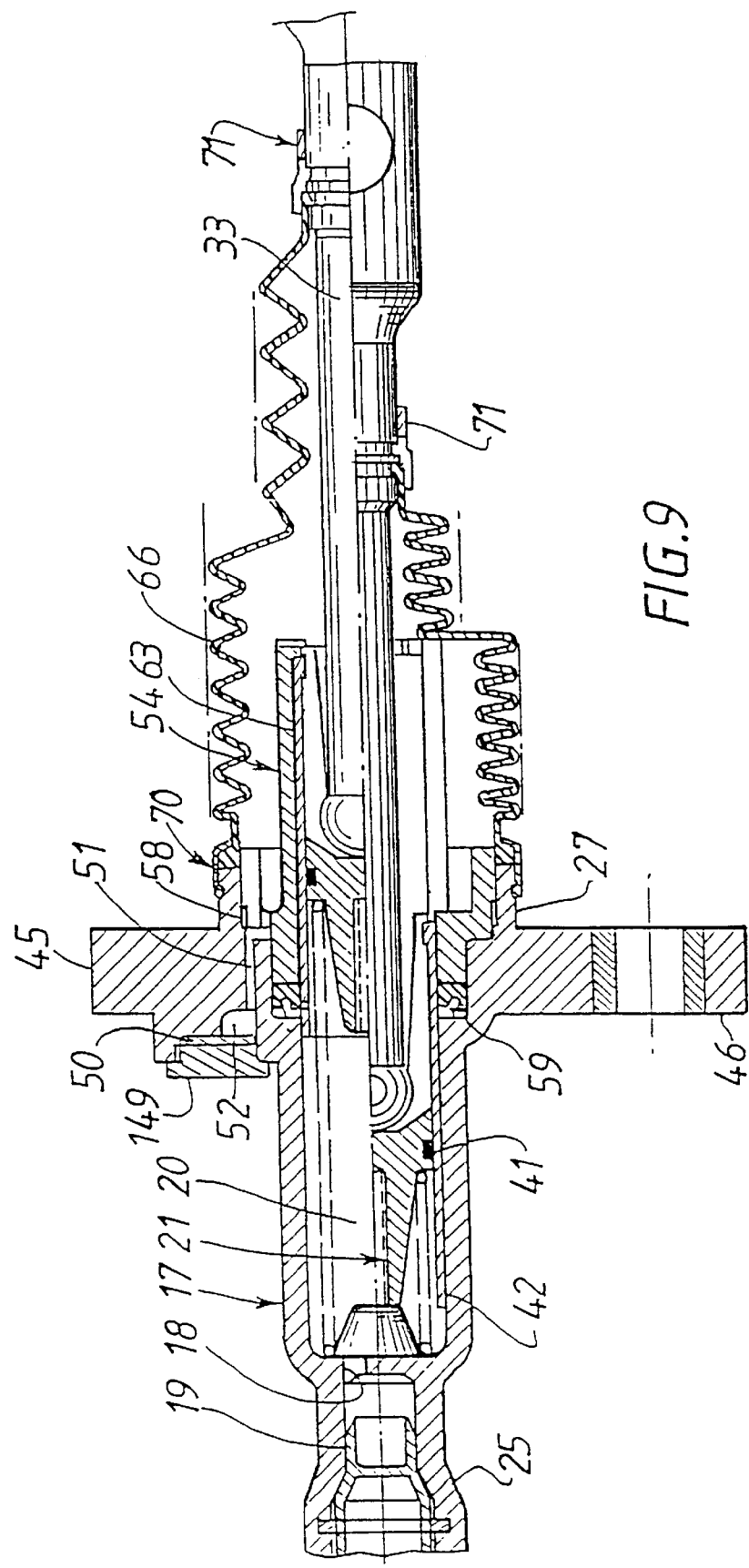

In all cases, whether adhesive bonding or ultrasonic welding is used, a sealed fastening is obtained, without any additional seal, of the tube 49 on the plate 45, the tube 49 being inclined with respect to the plate 45. As a result of this, the ducts 51 and the groove 52 are easily formed by moulding. In another version, the tube 49 is replaced, as can be seen in FIG. 9, by a plug 149 which obturates the aperture 50, and which is secured by sealed adhesive bonding or sealed ultrasonic welding to the plate 45, like the tube 49 in FIG. 6. The body 17 is accordingly standardised.

In this example the interior of the tube is of stepped diameter, to define three bores 22, 23 and 123.

In the manner described above, the bore 22 having the smallest diameter is formed in the front part 26 of the body 17, while the other two bores 23, 123 are made, respectively, in the rear part 27 and in the plate 45 of the body 17.

The bore 123 is formed centrally in the plate 45, and it has an intermediate diameter with respect to the bore 23 formed in the rear part 27.

Because of the bores 23, 123, a fastening and guiding skirt 54 can be fitted in the body 17. This skirt 54 is thicker than the piston skirt 42. The skirt 54 is made of plastics material, and has an internal bore the diameter of which is equal to that of the bore 22 in the front part of the body 17. The skirt 54 is fixed to the body 17. Thus the said skirt 54 is fixed, while the piston skirt 42 is movable axially.

The skirt 54 guides the piston skirt 42. More precisely, the inner periphery of the skirt 54 of plastics material is in intimate contact with the outer periphery of the metal piston skirt 42. The skirt 54 has a stepped diameter externally, so that the said skirt 54 is fitted by insertion into the rear part 27 and into the plate 45, the outer periphery of the skirt being in cooperation with the inner periphery of the plate 45 and that of the rear part 27 of the body 17. The said skirt 54 is therefore inserted in a complementary manner in the bores 123, 23.

The tubular skirt 54 has, integral with each other, a front portion 55, an intermediate portion 56 and a rear portion 57.

The front portion 55 is received in the complementary bore 123, while the portion 56 is received in the complementary bore 22.

After the skirt 54 has been inserted in the body 17, the skirt is fastened sealingly within the body by ultrasonic welding in the region of the outer periphery of the portion 56 and the inner periphery of the rear portion 27, as is indicated at 58 in FIG. 6.

In another version, the skirt 54 is sealingly attached by adhesive bonding on the body 17.

The intermediate portion 56 partly surrounds the rear portion 57, and there is a large annular space between the portions 56 and 57.

The rear portion 57 has an outer diameter which is smaller than that of the front portion 55, the outer diameter of the latter being itself smaller than that of the intermediate portion 56. The portion 57 is longer in the axial direction than the portion 56 or 55, so as to give good guidance to the movable skirt 42. The lengths of the portions 55, 56 are a function of the length of the bores 23, 123.

Sealing of the hydraulic chamber 20 with respect to the outside is provided by a dynamic seal 59 which is carried by the cylinder body 17, and which cooperates with the outer periphery of the piston skirt 42, that is to say with the cylindrical outer surface of the skirt 42.

The seal 59 is mounted within the bore 123, and is therefore in contact with the inner periphery of the plate 45 which defines the bore 123. The seal 59 is in axial contact with the front face of the front portion of the guide skirt 54, and with axial bosses 60 which are formed integrally by moulding with the transverse shoulder 61 that joins the bore 22 to the bore 123.

Thus the seal 59, which is a so-called secondary seal, makes a good abutment on the bosses 60, and is preserved. In this connection, in the case where the seal 59 is in contact with the shoulder 61, a deformation of the seal 59 occurs in the region of the radius joining the shoulder 61 to the inner periphery of the plate 45. The seal 59 is a lip seal. The piston skirt 42 has at least one hole for providing communication between the inside and the outside of the skirt 42.

This hole 62 is located as a function of the axial movement of the piston 21 and skirt 42 on either side of the lip seal 59. Then, this hole 62, when the clutch is engaged, provides communication between the hydraulic control chamber 20 and the external main reservoir.

During actuation of the clutch, this communication is interrupted because the hole 62 is displaced on the other side of the seal 59.

In this example several holes 62 are provided in order to give a greater flow of fluid and to prevent orientation during fitting.

The holes 62 are spaced apart at regular intervals.

It will be noted that the skirt 54 immobilises the seal 59 axially, so that it constitutes an immobilizing skirt.

This skirt 54 has at its inner periphery at least one axial groove 63 which is accordingly open in the region of the lip of the seal 59. In this example several axial grooves 63 are provided.

As can be seen in the upper part of FIGS. 5 and 6, in the advanced position, with the clutch engaged, there is communication between the chamber 20 and the grooves 63 via the holes 62, the inclined lip of the seal 59 enabling such communication to exist. The holes 62 are adapted to be displaced on either side of the second seal 59.

All of this enables communication to be obtained with the external reservoir, and enables leaks to be recovered.

More precisely, the external reservoir is connected to the tube 49 in communication with the aperture 50, the groove 52 and the internal bore 23, via the ducts 51 which are open into a space bounded by the transverse shoulder 64 joining the bore 123 to the bore 23, through the front face of the intermediate portion 56, and through the outer periphery of the portion 55 and the inner periphery of the rear portion 27.

Passages 65 are formed axially in the intermediate portion 56 so as to put the fluid coming from the external reservoir into communication with the annular space that exists between the portions 56, 57 and the grooves 63 which have a closed base.

In order to avoid escape of the fluid outwards, a sealing bellows 66 is provided, which is fitted between the rear portion 27 of the body 17 and the rear of the piston rod 33. In this example, the liquid is able to pass through the plate 45 and the fastening and guide sleeve 54, so as to reach the axial grooves 63 and to communicate with the chamber 20 via the passage holes 62.

In accordance with one feature, the skirt 54 limits axial displacement in one direction of the unit consisting of the piston 21 and piston skirt 42.

For this purpose, the fixed skirt 54 has at its rear end at least one abutment 67 (FIG. 7), and in this example a plurality of abutments, orientated transversely and allowing fluid to pass. Thus, the piston skirt 52 which is movable axially is able to come into contact, in the advanced position, through its rear face with the abutments 67. The rear end of the piston 21 projects axially with respect to the rear end of the skirt 42, which is subjected to small forces when it is in contact with the abutment 67, because the chamber 20 is depressurised.

It will be noted that there is fluid communication between the grooves 63 and the space outside the skirt 54, because of the radial clearance that exists between the piston 21 and the abutments 67.

The bellows 66, which in this example is of elastomeric material, has at each of its ends transverse beads 68, 69 which are fixed, respectively, on the body 17 and on the piston rod 33, with the aid of fastening members 70, 71 which in this example are of metal.

Figure 2:
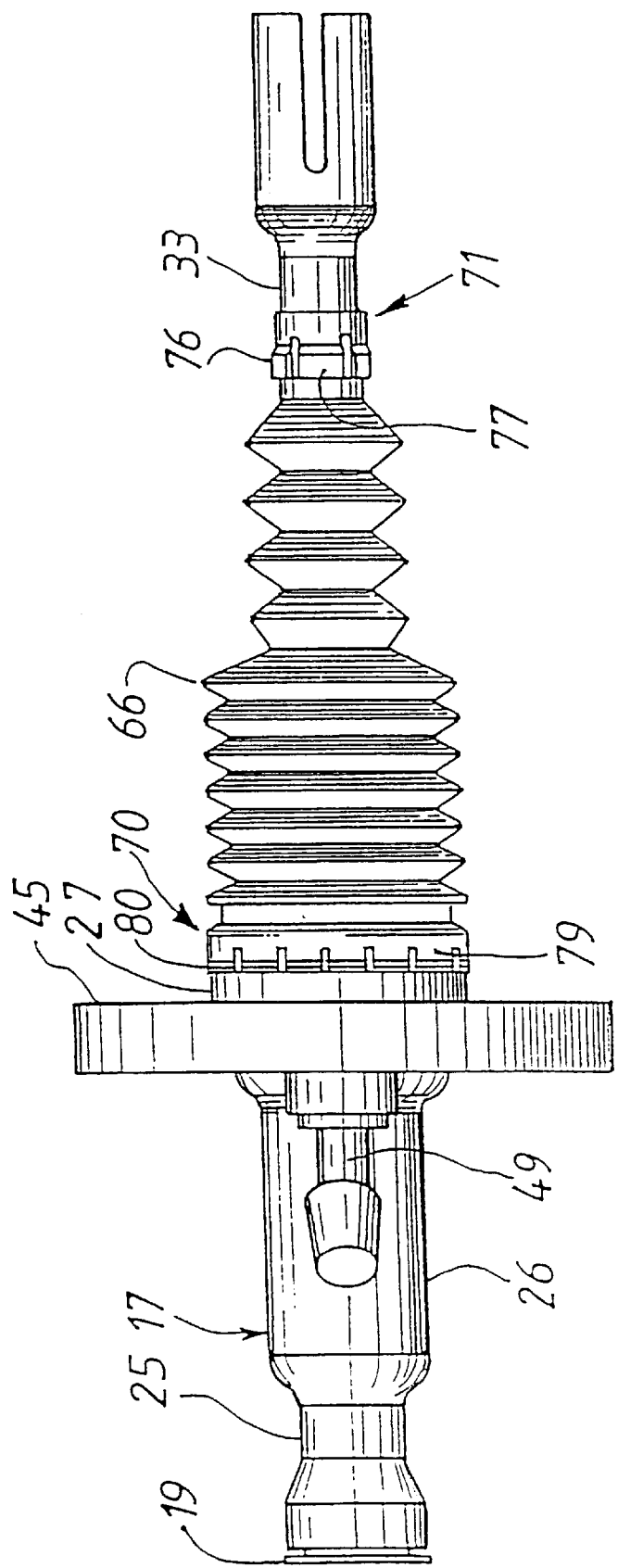
FIGS. 2 to 4 are views as seen in the direction of the arrows 2, 3 and 4 respectively in FIG. 1, FIGS. 5 and 6 are partial views of an enlarged scale showing, respectively, the front part and the rear part in FIG. 1.

More precisely, the rear end of the rod 33 has two grooves 72, 73 which are separated axially. The groove 72 is arranged to receive the bead 69, while the groove 73, which is the one furthest away from the body 17, is arranged to receive pads 74 of the tubular fastening member 71, as can be best seen in FIG. 2. This member 71 consists of a collar piece of stepped diameter (FIG. 2), with a continuous rear portion which is extended by a front portion 76 of larger diameter and divided by slots into radially elastically deformable lugs 77. The pads 74 are part of the lugs 77, and project inwards from the member 71.

Thus, the rear end of the bellows 66 is surrounded by the front portion 76 of the component, being trapped between this portion 76 and the rod 33, with the bead 69 being lodged within the groove 72.

The pads 74 penetrate into the groove 73 so as to locate the collar piece 71 axially.

The member 70 is in the form of a collar piece with a base 77 which extends generally radially.

Like the collar piece 71, the collar piece 70 has lugs 79 with deformations 80 which are engaged in a groove (not given a reference numeral) which is formed at the outer periphery of the rear part 27 of the body 17.

The bead 68 is trapped and gripped in a cavity which is bounded by the rear face of the body 17, the outer periphery of the intermediate portion 56 and the base 78.

The bellows 66 is of stepped diameter, and comprises a rear part of smaller diameter which is adapted to come into engagement against the rear face of the portion 57, and a front part of larger diameter which surrounds the portion 57. The rear and front parts of the bellows are of accordion form.

The portion 57 has external blind slots 83 for receiving a tool for fitting and centring the skirt 54. The slots 83 are open at the rear of the portion 57 and are closed at the front by the portion 56.

Thus the fitting tool surrounds and centres the portion 57, and it centres the piston skirt 42 by virtue of projections extending through the slots 83 so as to come into engagement with the skirt 42.

It is thus possible to insert the assembly consisting of the skirt 54, the skirt 42 and the piston 21 in the body 17 and to proceed to fastening the skirt 54 to the body 17 by ultrasonic welding. It is of course possible to replace the axially orientated blind slots 83 with oblong holes. In general terms, the rear portion has apertures for passage of the projecting elements of the fitting tool.

The low cost of the hydraulic control device in accordance with the invention, and its ease of assembly, will be appreciated.

In this connection, the skirt 42 is fitted over the piston 21. Similarly, the tube 49 and the skirt 54 are inserted respectively in the aperture 50 and the bores 23, 1 23.

The fastening members 70, 71 are fitted respectively over the portion 57 and over the rod 33. The bellows 66, with the body 17 and the rod 33, defines an integral working reservoir. Ultrasonic welding between the body 17 and the fixed skirt 54 gives sealing.

Thus, the emitter cylinder in accordance with the invention makes use of a single dynamic seal, namely the seal 59, together with static seals, namely the seal 41 and the beads 68, 69 of the bellows 66. The seals 59 and 41 are protected because they are submerged in the control fluid.

One dynamic seal is eliminated by virtue of the holes 62, grooves 63 and the bellows 66 with its beads 68, 69.

In FIG. 1, the rear part of the bellows 66 is never fully compressed. The initial volume of fluid contained in this rear part is transferred into the interior of the body 17 by the axial displacement of the piston 21 It is then possible to omit the external main reservoir. This is what is shown in FIG. 9, by virtue of the plug 149. It is of course necessary to have regard to wear in the friction liners of the clutch in order to provide the appropriate volume within the integral reservoir which is defined by the bellows and which is interposed between the body 17 and the rod 3. This reservoir therefore constitutes the only reservoir.

Figure 8:
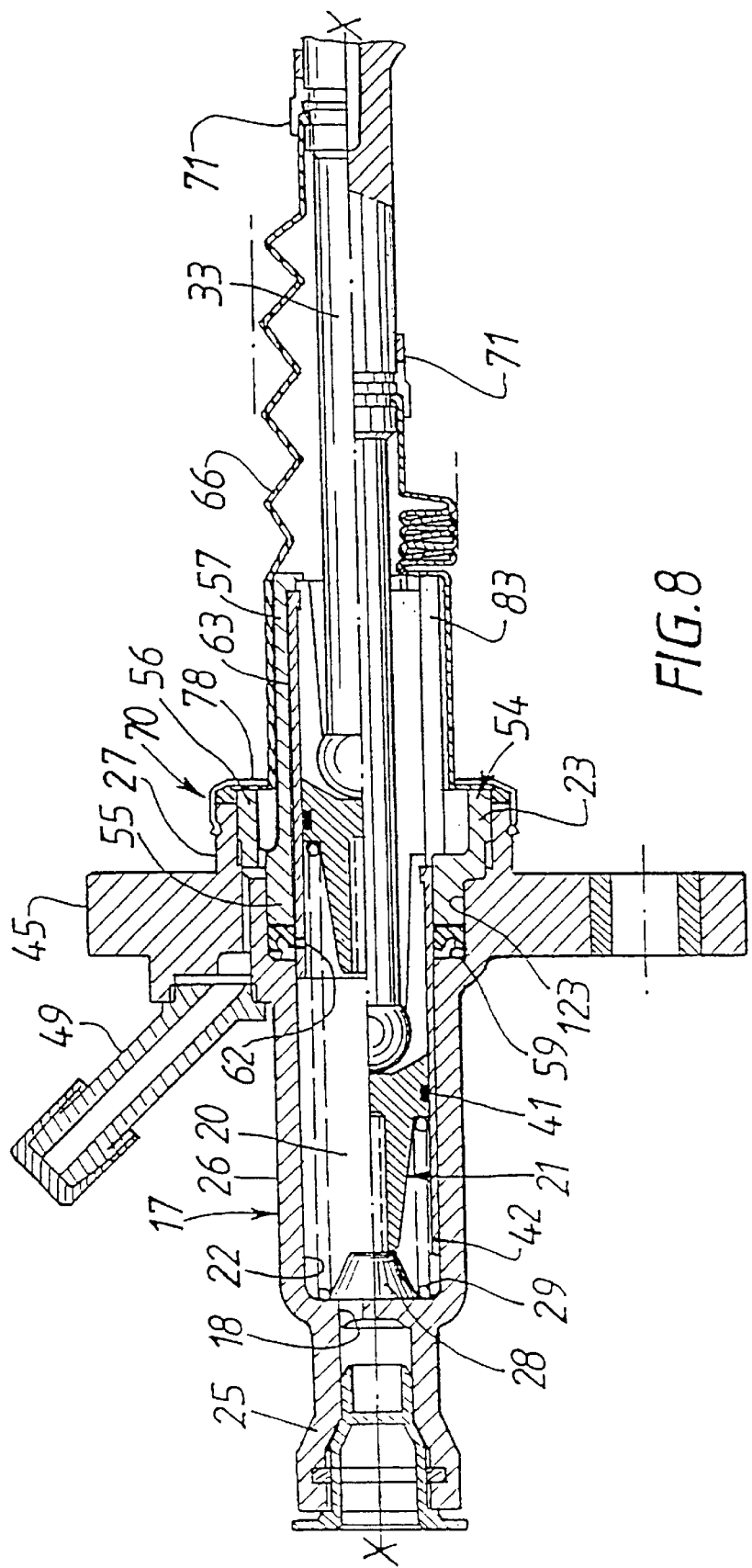
FIGS. 8 to 10 are Figures which are similar to FIG. 1, but which show further embodiments.

In FIG. 8, the rear part of the bellows 66 is fully compressed, so that it is essential to provide an external reservoir, the working reservoir being no longer present.

Only the rear part of the bellows is of accordion form, the front part of the bellows being fitted over the portion 57.

Figure 10:
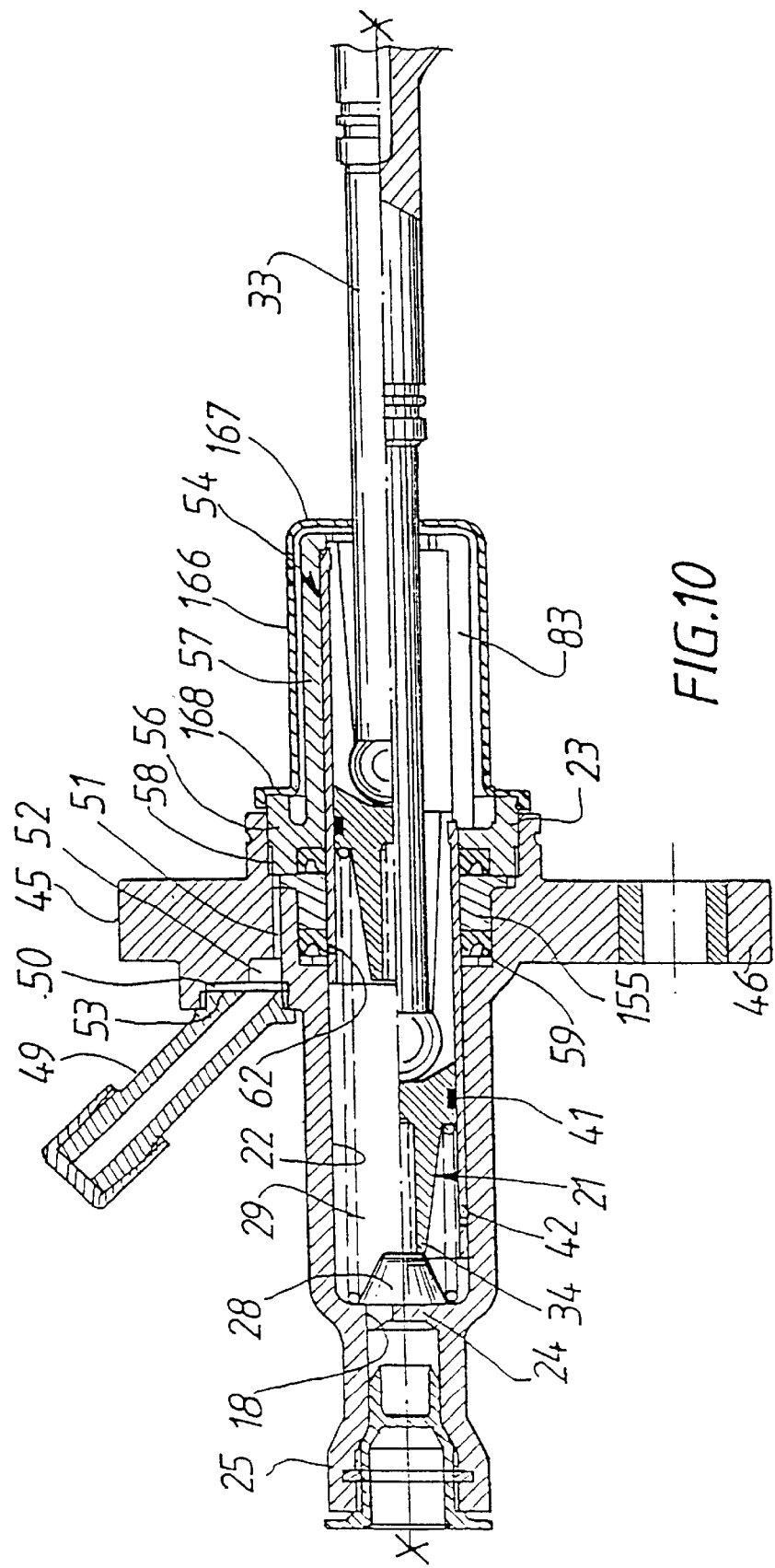

It is of course possible to omit the bellows, as can be seen in FIG. 10.

In that case, a protective cap 1 66 is provided for giving resistance to shocks. The cap, which is of cylindrical form, surrounds the fixed skirt 54 and is provided at its rear end with a base portion 1 67 which has a central hole through which the piston rod passes. At its front end, the cap 166 has an annular radial flange 168 which extends outwards.

This flange 168 is fixed on the fixed skirt 54 by snap-fitting, which is obtained by means of a bead engaged in a groove in the body 17.

In this case the fixed skirt 54 only has an intermediate portion 56 and a rear portion 57.

The front portion of FIGS. 1 to 9 is replaced by a locating ring 155 in order to enable a second dynamic seal 159 to be fitted between the locating ring 155 and the portion 56, which is formed with a rebate in its inner periphery to accommodate the seal 159. The locating ring 155 has radial grooves (not shown) at its rear end. The locating ring 155 has internal axial grooves which replace the grooves 63 of FIGS. 1 to 9. Thus, liquid is in communication with the tube 49 through the holes 62.

In FIG. 10 the seal 159 is an additional seal which prevents leakage to the outside.

The cap 166 can of course surround the bellows 66 of FIGS. 1 to 9. For this purpose, the fastening member 70 may be extended rearwards by a tubular portion, at least partly surrounding the bellows. In another version, the fastening member 71 is extended by a tubular portion at the front for partly surrounding the bellows.

In a further version, the tube 49 and the fixed skirt 54 are of course mounted in the body 17 by clip-fastening with the aid of an elastic wire clip fastener similar to the elastic clip 48, with passages for the clip being again provided, respectively, in the edge of the aperture 50 and in the rear part 27. In another version the members 49, 54 are fitted in the body 17 by means of a mounting of the bayonet type.

In these variants, an additional seal must be provided.

The present invention is of course applicable to the receiver cylinder.

In all cases the piston skirt encloses the piston and forms a sub-assembly with the latter.

The piston skirt 42 penetrates into the hydraulic chamber 20 and bounds the latter. More precisely, the skirt 42 penetrates into the bore 22 of the front part 26; the bore 22 is extended axially by the internal bore of the fixed skirt 54, which can be referred to as the first skirt.

Because of the projecting element 28, the inlet port 18, which constitutes a connecting port, can in another version be open into the front portion 26 between the base 24 and the piston skirt 42, having regard to the fact that this skirt is spaced away from the base when the piston 21 is in its retracted position.

The transverse wall 30 of the piston can of course be thicker, so that the seating 138 for receiving the head 40 of the rod 33 (FIG. 6) can be formed as a hollow in the transverse wall 30.

In the Figures shown, the seating 138 extends in cross section over a little more than 180° so as to retain the rod 33 axially.

In another version, the seating 138 extends over 180° at least, and an attached ring, such as an open circlip, is attached in the piston 21 so as to locate the rod 33 axially.

This arrangement makes it possible to use a sleeve 38 which is continuous and rigid. The formation of a slotted sleeve 38 does of course facilitate the fitting of the piston skirt 42 over the piston 21.

The piston 21 is located axially at its outer periphery on the piston skirt 42, which can be referred to as the second skirt. For this axial location, the second skirt 42 may have a single lug, for example in the form of a bead which is engaged in a continuous groove of the piston, which in another version may be formed in the transverse wall 30 of the piston 21.

A single lug and a single recess can therefore be provided on one of the elements consisting of the second skirt 42 and the piston 21.

The metal second skirt 42 is fixed at least axially to the piston 21, while the fixed first skirt 54 is fixed to the body 17, and is of mouldable plastics material.

In FIGS. 1 to 9, a flexible element of elastic material defines a reservoir which is incorporated in the emitter cylinder. This element consists of a bellows 66 made of an elastomer such as rubber.

The second skirt 42 slides axially in the first skirt 54, while the seal 59 is in dynamic cooperation with the second skirt 42.

The chimney element 34 gives access to the outer periphery of the front face 31 of the piston 21, while the sleeve portion 38 enables access to be obtained to the central portion of the rear face 32.

The fastening members 70, 71 grippingly cover the ends of the flexible element of elastic material, which in this example is the bellows.

In FIG. 8 the base 78 of the fastening member 70 extends further inwards in the radial direction.

In all the Figures, axial ribs, not given a reference numeral, join the portion 56, 57 radially together, while allowing the fluid coming from the external or internal reservoir to pass through.

In FIG. 10, the cap 166 for protecting the first skirt 54 is fixed on the intermediate portion of the latter. The same can be true in FIGS. 1 to 9. To this end, it is sufficient, firstly, to form a rebate in the rear end of the intermediate portion 56 so that the bead 68 can be fitted, and secondly, to make the groove for receiving the pads of the member 70 at the outer periphery of the portion 56.

It is of course possible to provide only a single pad on the members 70 and 71, in the form of a bead.

The member 70 is fixed on one of the elements consisting of the cylinder body 17 and the first skirt 54.

It then becomes possible to omit the ears 46 of the plate 45, and to fasten the cylinder body 17, using a bayonet fitting, on a fixed part in the manner described in the document GB-A-1 539 879, to which reference should be made for more detail.

This fitting may of course be obtained using one of the portions 26, 27 or the plate 45. The plate 45 can then be without any means for fastening it on a fixed part. The plate 45 is then able to be annular.

The apertures 83, which in this case are in the form of blind holes, formed in the rear portion 57 of the skirt 54, are openings giving access to the second skirt 42 so that the fitting tool can be engaged with the second skirt 42, this tool being in engagement with the first skirt 54. All combinations are possible.

In FIG. 8 the bellows 66 may consist only of a rear part of accordion form, fixed at the front on a protective cap surrounding the portion 57 and attached sealingly on the rear portion 27.

The second skirt 54 and the tube can be attached by screw fastening on the body 17.

The fastening member 71 may be replaced by a gripping collar. This member 71 can be fixed by seaming on the rod. The same is true for the member 70.

In another version, fastening of the member 70 is obtained with the aid of screws.

It is of course possible to replace the ultrasonic welds by means of sealed spot welds by indirect application of heat using at least one source of energy of the laser type. Radiation, in the form of a beam emitted by the laser, is for example in the infra-red radiation range.

One of the elements to be welded is of a material which is transparent to infra-red radiation, while the other one of these elements is so configured as to absorb this said radiation. For example, this other element is in material which is transparent to the said radiation and includes at least one additive for absorbing the said radiation. This other element can of course be one that is absorbent to that radiation.

Thus, fastening of the tube 49 to the plate 45 can be obtained by this welding by indirect application of heat, giving sealed fastening. The tube 49 is so configured as to absorb the said radiation, and is for example of material transparent to the said radiation and having an additive to make it transparent. The additive is for example in the form of pigments such as carbon in a proportion of 1 to 2%. It is the component that is closest to the laser that is made of transparent material, while the other is of absorbent material. Preferably, the laser is turned with respect to the element to be welded. The inverse is of course possible. Thus the plate 45 is of transparent material.

This type of welding is more advantageous than ultrasonic welding, because it protects the seal 59 together with the components to be welded, in such a way that the control cylinder is more reliable. Because of this, the ducts 51 and the groove 52 are easily made. The sealed fastening at 58 can be obtained using welding by indirect application of heat.

The plug 149 may be secured using this type of welding.

Fastening of the skirt 54 in the body 17 can be effected by indirect application of heat, with the plate 45 being of material transparent to the said radiation, while the other components to be welded are of material so configured as to absorb the said radiation.

In place of sealed ultrasonic welding, or welding by indirect application of heat, it is of course possible, for example at 58, to carry out sealed friction welding and sealed high frequency welding. In another version, the sealed fastening is a fastening of the mirror welding type or the type in which ferromagnetic welds are made by induction welding.

As will be clear from the description and drawings, the skirt 54, or so-called first skirt, and the piston are of plastics material, while the first skirt 54 has at least one abutment element 67 which is adapted to cooperate with a rear end of the piston so as to limit the rearward axial displacement of the piston.

This abutment is arranged to cooperate with the rear end of the skirt 42 which is called the second skirt.

In practice, the axial rear end of the first skirt has a plurality of transversely orientated abutments which extend radially inwards. These abutments 67 are spaced apart angularly at regular intervals so as to enable fluid to pass through.

With this design for axial retention of the piston towards the rear, reduced tolerance is obtained in the value of the course of dead travel of the piston, in so far as it results from the aggregate of the tolerances of three components, that is to say the piston skirt 42, the external skirt 54 and the cylinder body.

In the embodiments described, the cylinder body 17 carries the intermediate plate, with which it is integral.

In another version the plate 45 is attached on the body 17.

Thus, the control device comprises the cylinder body 17, the skirt 54 and a central member which is interposed between the cylinder body 17 and the skirt 54. This components constitutes the plate 45. The dynamic seal is lodged within this intermediate member. The tube 49 is fixed on the plate 45 and is connected to a transverse duct formed within the plate. This duct then opens into a central hole of the plate 45 facing the external portion of the skirt 45. Two dynamic seals can then be mounted within the plate. This plate then includes housings for mounting dynamic seals of configurations similar to the seal 59. Fastening of the plate 45 on the body 17 is obtained in a manner similar to the fastening of the skirt on the plate 45, that is to say using welding of the same type as the weld 58, the plate 45 having a front portion similar to the portion 27 for the welding operation. The plate 45 does not serve for guiding the skirt 42, there being a radial clearance between the skirt and the contour of the hole in the plate, so that the duct connected to the tube is able to open into a cavity closed by the two dynamic seals. It is the cylinder body and the skirt that guide the piston skirt 42. For more detail, reference should be made to the document FR 99.024.26 filed on Feb. 26, 1999.

What is claimed is:

1. A hydraulic control device for a clutch, especially for a motor vehicle, comprising at least one control cylinder having a first skirt (54), a cylinder body (17) having an anterior base (24) and open at the rear for receiving the first skirt (54) fastened thereto, a piston (21) sliding axially in the cylinder body (17), a piston skirt (42) referred to as a second skirt, which is fixed axially with respect to the piston (21) and which slides axially in the first skirt (54), a piston seal (41) carried by the piston (21), a second seal (41) carried by the cylinder body (17) for cooperation with the first skirt (42), a piston rod (33) having an anterior head (40) for cooperating with the piston (21), wherein the cylinder body (17), the first skirt (54) and the piston (21) are of plastics material while the second skirt (42) is of metal, and wherein the piston (21) has a front face (31) defining the hydraulic chamber (20) and a rear face (31) cooperating with the piston rod (33), wherein the piston (21) is so configured as to receive the head (40) of the piston rod (33) and surrounded by the second skirt (42), and wherein the piston seal (41) is interposed operatively between the outer periphery of the piston (21) and the inner periphery of the second skirt (42), which penetrates into the hydraulic chamber (20), wherein the piston (21) has a transverse wall (30) bounded by the front face (31) and rear face (32), and in that the transverse wall (30) is extended forward by a chimney element (34) and the base (24) of the cylinder body (17) carries an axially projecting element (28) adapted to cooperate with the chimney element (34) to limit forward displacement of the piston (21).

2. A device according to claim 1, wherein the transverse wall (30) is extended rearward by a sleeve portion (38), into which the piston rod (33) penetrates, the sleeve portion (38) has an outer diameter greater than that of the chimney element.

3. A device according to claim 2, wherein the piston seal (41) is carried by the transverse wall.

4. A device according to claim 2, wherein the end face (36) of the projecting element (28) acts as an abutment for a front face (37) of the chimney element (34).

5. A device according to claim 4, wherein the projecting element (28) and the chimney element (34) are frusto-conical so as to serve for centring a return spring (29) which is interposed operatively between the base (24) of the cylinder body (17) and the front face (31) of the piston (21) and the return spring (29) is mounted around the chimney element (34).

6. A device according to claim 2, characterized in that the sleeve portion (38) is of split form and, with the transverse wall (30), defines a seating (138) for receiving the head (40) of the piston rod (33), and in that the second skirt (42) is fitted over the transverse wall (30) of the sleeve portion (38).

7. A device according to claim 1, characterized in that one of the elements consisting of the second skirt (42) and the piston (21) has at least one projecting element that penetrates into a recess formed in the other one of the elements consisting of the piston (21) and the second skirt (42).

8. A device according to claim 7, characterized in that the second skirt (42) has projecting elements, and in that the piston (21) has a groove (43) for receiving projecting elements of the second skirt (42).

9. A device according to claim 8, characterized in that the projecting elements consist of deformations in the second skirt (42).

10. A device according to claim 9, characterized in that the groove in the piston (21) is formed in a posterior sleeve portion (38) of the piston (21).

11. A device according to claim 1, characterized in that the first skirt (54) has at its rear end at least one abutment (67) adapted to cooperate with the rear end of the second skirt (42) so as to limit the displacement of the piston (21).

12. A device according to claim 1, characterized in that the second skirt (42) has at least one hole (62) for providing communication between the inside and the outside of the second skirt (42), and in that the hole (62) is adapted to be displaced on either side of the second seal (59).

13. A device according to claim 12, characterized in that the second skirt (42) has at least one axial groove (63) at its inner periphery.

14. A device according to claim 1, characterized in that an integral reservoir is interposed operatively between the rear of the cylinder body (17) and the piston rod (33).

15. A device according to claim 14, characterized in that the integral reservoir is defined by a flexible element (66) of elastic material.

16. A device according to claim 15, characterized in that the flexible element of elastic material has, at both ends, beads (68, 69) by which it is fixed, with the aid of respective fastening members (70, 71), on one of the elements consisting of the cylinder body (17) and the first skirt (54), and on the piston rod (33).

17. A device according to claim 16, characterized in that the flexible element of resilient material consists of a bellows (66).

18. A device according to claim 16, characterized in that the fastening member (71) fastening the element (66) of elastic material on the piston rod (33) includes projecting elements (74), and in that the piston rod (33) h as a first groove (73) and a second groove (72) respectively, for receiving the projecting elements (74) and for receiving the bead (69) of the flexible element of plastics material, and in that the fastening member (71) overlies the flexible element of plastics material.

19. A device according to claim 14, characterized in that the cylinder body (17) includes an intermediate plate (45) between its front part (26) and its rear part (27), in that the plate has an anterior aperture (50), in that at least one duct (51) extends through the plate (45) so as to connect the aperture to the bore (23) of the said rear part (27), and in that the first skirt (54) has holes for putting the duct (51) into communication with the integral reservoir interposed between the cylinder body (17) and the piston rod (33).

20. A device according to claim 19, characterized in that the aperture (50) serves as a receptacle either for a plug (149) or for a tube (49) adapted to be connected to an outside reservoir.

21. A device according to claim 1, characterized in that the first skirt (54) is inserted in the cylinder body (17), being fixed to the said body (17) with a sealed fastening such as an ultrasonic weld or an adhesive bond.

22. A device according to claim 1, characterized in that the first skirt (54) has external apertures for giving access to the second skirt (51).

* * * * *